(12) United States Patent
McDaniel et al.

(10) Patent No.: US 10,457,854 B2
(45) Date of Patent: Oct. 29, 2019

(54) THERMALLY-STABLE, NON-PRECIPITATING, HIGH-DENSITY WELLBORE FLUIDS

(71) Applicant: Halliburton Energy Services, Inc., Houston, TX (US)

(72) Inventors: Cato R. McDaniel, The Woodlands, TX (US); William W. Shumway, Spring, TX (US); Timothy Harvey, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/512,019

(22) PCT Filed: Oct. 17, 2014

(86) PCT No.: PCT/US2014/061253
§ 371 (c)(1),
(2) Date: Mar. 16, 2017

(87) PCT Pub. No.: WO2016/060693
PCT Pub. Date: Apr. 21, 2016

(65) Prior Publication Data
US 2017/0247605 A1    Aug. 31, 2017

(51) Int. Cl.
*C09K 8/40*  (2006.01)
*C09K 8/66*  (2006.01)
*C09K 8/05*  (2006.01)
*C09K 8/84*  (2006.01)
*C09K 8/02*  (2006.01)
*C09K 8/60*  (2006.01)

(52) U.S. Cl.
CPC ............... *C09K 8/665* (2013.01); *C09K 8/02* (2013.01); *C09K 8/05* (2013.01); *C09K 8/40* (2013.01); *C09K 8/60* (2013.01); *C09K 8/845* (2013.01)

(58) Field of Classification Search
CPC ........ C09K 2208/10; C09K 8/54; C09K 8/60; C09K 2208/20; C09K 2208/22; C09K 2208/24; C09K 2208/26; C09K 8/516; C09K 8/536; C09K 8/584; C09K 8/706; C09K 8/92; C09K 15/30; C09K 8/05; C09K 8/512; C09K 8/665; C09K 8/40; C09K 8/845; C09K 8/02; C09K 8/06; C09K 8/36; C09K 8/601
See application file for complete search history.

(56) References Cited

U.S. PATENT DOCUMENTS

| | | |
|---|---|---|
| 4,557,718 A | 12/1985 | Kamps et al. |
| 5,632,382 A | 5/1997 | Patrick et al. |
| 6,620,341 B1 | 9/2003 | Verma et al. |
| 8,697,611 B2 * | 4/2014 | Zhang ............... C09K 8/36 175/65 |
| 2003/0114318 A1 | 6/2003 | Benton et al. |
| 2004/0149431 A1 | 8/2004 | Wylie et al. |
| 2008/0135302 A1 * | 6/2008 | Zhang ............... C09K 8/06 175/70 |
| 2012/0302468 A1 * | 11/2012 | Falana ............... C09K 8/08 507/110 |

OTHER PUBLICATIONS

International Search Report and Written Opinion dated Jun. 29, 2015; International PCT Application No. PCT/US2014/061253.

* cited by examiner

*Primary Examiner* — Kumar R Bhushan
(74) *Attorney, Agent, or Firm* — McGuire Woods LLP

(57) ABSTRACT

A wellbore treatment fluid comprising: a base fluid; and a water-soluble salt, the salt comprising: a cation; and an anion, wherein the anion is selected from phosphotungstate, silicotungstate, phosphomolybdate, and silicomolybdate. The treatment fluid can have a density greater than or equal to 13 pounds per gallon. A method of treating a portion of a subterranean formation penetrated by a well comprising: introducing the treatment fluid into the well.

12 Claims, 1 Drawing Sheet

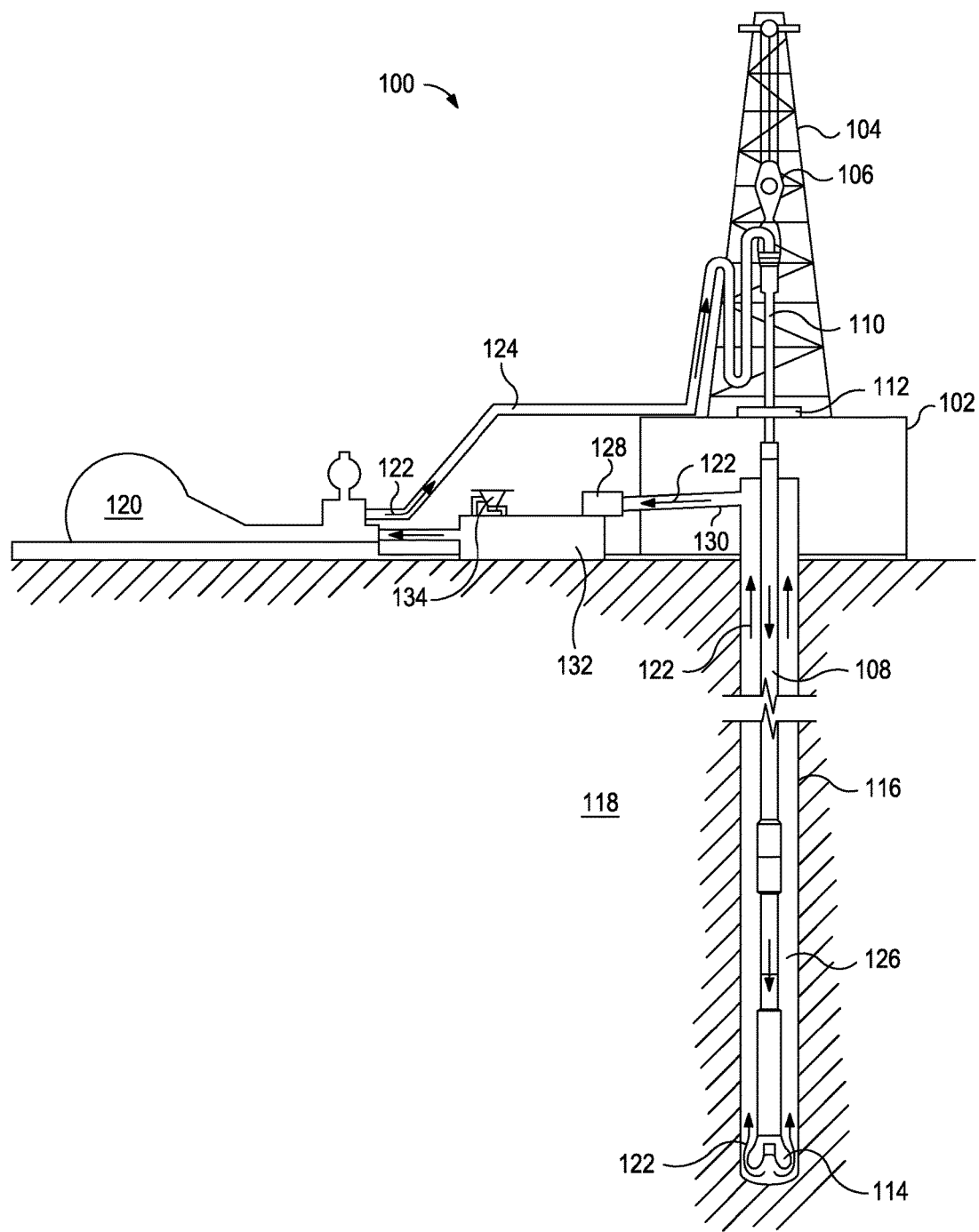

THERMALLY-STABLE, NON-PRECIPITATING, HIGH-DENSITY WELLBORE FLUIDS

TECHNICAL FIELD

Treatment fluids are used in a variety of oil and gas operations. Some treatment fluids are heavy brines that are made of a heavy salt and a base fluid. A thermally-stable, non-precipitating, high-density brine and methods of use are provided. The brine can be used as a wellbore fluid.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIG. 1 is a diagram illustrating a well system according to certain embodiments.

DETAILED DESCRIPTION OF THE INVENTION

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. As used herein, the term "base fluid" means the solvent of a solution or the continuous phase of a heterogeneous fluid, and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, completion fluids, and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Some treatment fluids need a high density to provide a balanced or overbalanced wellbore. As used herein, a "high density" fluid is one in which the density is greater than or equal to 13 pounds per gallon "ppg" (1.56 kilograms per liter "kg/L"). A balanced wellbore exists when the hydrostatic pressure of the column of wellbore treatment fluid equals the pressure from the subterranean formation; while an overbalanced wellbore exists when the hydrostatic pressure exceeds the formation pressure. In order to provide a high density fluid, a water-soluble salt having a high molar mass can be dissolved in the base fluid of the treatment fluid. The resulting treatment fluid can have a desired density.

However, certain water-soluble salts are not stable or thermally stable. As used herein a treatment fluid is considered "stable" if no more than 60% of any un-dissolved solids settle to the bottom half of a column of the fluid and dissolved substances do not precipitate out of solution. As used herein, a "thermally stable" treatment fluid is a fluid that remains stable at temperatures in excess of 212° F. (100° C.). An example of a salt that is thermally unstable is ammonium tungstate. As a result of the thermal instability, the use of these types of salts to provide a high density fluid is not practical.

Therefore, there is a need and an ongoing industry-wide concern for improved salts that can be used to provide a high-density treatment fluid. There is also a need for these salts to be thermally stable. It has been discovered that phospho- and silico-tungstates and molybdates can be used as the anion of a salt. These salts are thermally stable and provide an excellent high density fluid.

According to certain embodiments, a wellbore treatment fluid comprises: a base fluid; and a water-soluble salt, the salt comprising: a cation; and an anion, wherein the anion is selected from phosphotungstate, silicotungstate, phosphomolybdate, and silicomolybdate.

According to certain other embodiments, a method of treating a portion of a subterranean formation penetrated by a well comprises: introducing a treatment fluid into the well.

It is to be understood that the discussion of preferred embodiments regarding the treatment fluid or any ingredient in the treatment fluid (e.g., the salt) are intended to apply to the method, treatment fluid, and system embodiments. Any reference to the units "gallons" means U.S. gallons.

The treatment fluid includes a base fluid. The treatment fluid can be a solution or a heterogeneous fluid. For a heterogeneous fluid, the base fluid is the continuous phase of the treatment fluid. Any of the phases of a heterogeneous treatment fluid can include dissolved substances or undissolved solids. The base fluid can include water. The water can be selected from the group consisting of freshwater, brackish water, saltwater, and any combination thereof.

The treatment fluid can be, without limitation, a drilling fluid, a drill-in fluid, a packer fluid, a completion fluid, a spacer fluid, a work-over fluid, or an insulating fluid. The treatment fluid can be introduced into the well prior to or after a second treatment fluid.

The treatment fluid can be a high-density fluid. Accordingly, the treatment fluid can have a density greater than or equal to 13 pounds per gallon "ppg" (1.56 kilograms per liter "kg/L"). The treatment fluid can also have a density greater than or equal to 18 ppg (2.16 kg/L). It is to be understood that while the treatment fluid can contain other ingredients in addition to the water-soluble salt, it is the presence and concentration of the water-soluble salt that is primarily or wholly responsible for imparting the stated density to the treatment fluid. Accordingly, the concentration of the water-soluble salt can be sufficient to provide a density of greater than or equal to 13 ppg (1.56 kg/L) or 18 ppg (2.16 kg/L) to the treatment fluid. Therefore, other additives, such as weighting agents do not need to be included in, and are preferably excluded from, the treatment fluid.

The treatment fluid also includes the water-soluble salt. The salt includes a cation and an anion, wherein the anion is selected from phosphotungstate, silicotungstate, phosphomolybdate, and silicomolybdate. It has been discovered that salts formed from these anions provide thermally stable fluids.

The cation can be organic or inorganic. The cation can be selected from ammonium, phosphonium, quaternary amines, poly-quaternary amines, alkaline earth metals, transition metals, and rare earth elements. According to certain embodiments, the cation is not an alkali metal.

The salt is water-soluble. According to certain embodiments, the type of salt and the concentration of the salt are selected, based on the mass of the salt and the solubility of the salt, to provide a density of at least 13 ppg (1.56 kg/L) or 18 ppg (2.16 kg/L) to the treatment fluid. In other words, a heavier salt may not need to be as soluble as a lighter salt in order to provide the stated density to the treatment fluid. One of ordinary skill in the art will be able to adjust the type of salt and concentration based on the mass and solubility of the salt to provide the stated density to the treatment fluid. The salt can be in a concentration in the range of about 11 ppg to about 20 ppg of the base fluid (about 1.1 to about 2.4 kg/L).

The treatment fluid can be stable. The treatment fluid can also be thermally stable. The treatment fluid can be thermally stable at temperatures greater than 212° F. (100° C.). The treatment fluid can also be thermally stable at temperatures greater than 350° F. (177° C.).

The treatment fluid can function to inhibit corrosion to wellbore parts and equipment. The treatment fluid can also provide lubricity to wellbore parts and equipment. The treatment fluid can further include one or more additives. The additive can be any additive commonly used in treatment fluids for the wellbore operation to be performed (e.g., a drilling fluid versus a work-over fluid). Examples of additives include, but are not limited to, a fluid loss additive, a bridging agent, a friction reducer, a defoaming agent, elastomers, a mechanical property enhancing additive, a lost-circulation material, a filtration-control additive, a gas migration control additive, a thixotropic additive, a viscosifying additive, and combinations thereof. It is to be understood that the treatment fluid can also contain other salts in addition to the water-soluble salt. These other salts can include chlorides, bromides, formates, etc. For example, the other salt can be selected from sodium chloride, calcium chloride, calcium bromide, potassium chloride, potassium bromide, magnesium chloride, etc.

The methods include the step of introducing the treatment fluid into a well. The well penetrates a subterranean formation. The subterranean formation can be a reservoir or adjacent to a reservoir. The step of introducing the treatment fluid can be for the purpose of drilling a wellbore, completing the wellbore, stimulating the wellbore, or performing a work-over on the wellbore. The treatment fluid can be in a pumpable state before and during introduction into the well. The subterranean formation can have a bottomhole temperature greater than 212° F. (100° C.) or greater than 350° F. (177° C.). As used herein, the term "bottomhole" means the portion of the well where the treatment fluid is located. The well can be an oil, gas, or water production well, an injection well, or a geothermal well. The well penetrating the subterranean formation can include an annulus. The step of introducing the treatment fluid can include introducing the treatment fluid into a portion of the annulus.

The methods can further include the step of introducing a cement composition into the well, wherein the step of introducing the cement composition is performed before or after the step of introducing the treatment fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the well. The methods can include the additional steps of perforating, fracturing, or performing an acidizing treatment, after the step of introducing the treatment fluid.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments, however, the disclosed fluids can be added to the drilling fluid 122 at any other location in the drilling assembly 100. In at least one embodiment, for example, there could be more than one retention pit 132, such as multiple retention pits 132 in series. Moreover, the retention put 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation penetrated by a well comprising:
   introducing a treatment fluid into the well, wherein the treatment fluid comprises:
   (A) a base fluid; and
   (B) a water-soluble salt, the salt comprising:
      (i) a cation selected from the group consisting of ammonium, phosphonium, quaternary amines, poly-quaternary amines, rare earth elements, and any combination thereof; and (ii) an anion, wherein the anion is selected from phosphotungstate, silicotungstate, and silicomolybdate.

2. The method according to claim 1, wherein the base fluid comprises water.

3. The method according to claim 2, wherein the water is selected from the group consisting of freshwater, brackish water, saltwater, and any combination thereof.

4. The method according to claim 1, wherein the treatment fluid has a density greater than or equal to 13 pounds per gallon.

5. The method according to claim 1, wherein the treatment fluid is a drilling fluid, a drill-in fluid, a packer fluid, a completion fluid, a spacer fluid, a work-over fluid, or an insulating fluid.

6. The method according to claim 1, wherein the cation is organic or inorganic.

7. The method according to claim 1, wherein the type of salt and the concentration of the salt are selected, based on the mass of the salt and the solubility of the salt, to provide a density of at least 13 pounds per gallon to the treatment fluid.

8. The method according to claim 1, wherein the treatment fluid is thermally stable at temperatures greater than 212° F.

9. The method according to claim 1, wherein the treatment fluid is thermally stable at temperatures greater than 350° F.

10. The method according to claim 1, wherein the subterranean formation has a bottomhole temperature greater than 212° F.

11. The method according to claim 1, wherein the treatment fluid is mixed with mixing equipment.

12. The method according to claim 1, wherein the step of introducing comprises pumping the treatment fluid into the well using a pump.

* * * * *